United States Patent [19]

Nonaka

[11] Patent Number: 5,621,712
[45] Date of Patent: Apr. 15, 1997

[54] REPRODUCING SYSTEM FOR AN OPTICAL RECORDING MEDIUM HAVING IMPROVED RESPONSE TO A HIGH SPEED SCANNING INSTRUCTION

[75] Inventor: Yoshiya Nonaka, Saitama, Japan

[73] Assignee: Pioneer Electronic Corporation, Tokyo, Japan

[21] Appl. No.: 712,751

[22] Filed: Sep. 12, 1996

Related U.S. Application Data

[63] Continuation of Ser. No. 342,014, Nov. 16, 1994, abandoned.

[30] Foreign Application Priority Data

Nov. 27, 1993 [JP] Japan .................. 5-288410

[51] Int. Cl.⁶ ............................................ G11B 7/00
[52] U.S. Cl. ................................... 369/60; 369/32
[58] Field of Search ..................... 369/32, 59, 47, 369/60, 54, 58, 48, 44.28

[56] References Cited

U.S. PATENT DOCUMENTS 4,321,700  3/1982  Russell ........................ 369/47
4,613,967  9/1986  Hamada et al. ................ 369/233
4,837,637  6/1989  Akiyama et al. ............... 369/32
5,477,516  12/1995  Takezawa ..................... 369/48

FOREIGN PATENT DOCUMENTS

0553730A2  8/1993  European Pat. Off. .
0570922A2  11/1993  European Pat. Off. .
0597483A1  5/1994  European Pat. Off. .
A-01245466  9/1989  Japan .

OTHER PUBLICATIONS

Patent Abstract of Japan, vol. 17, No. 438, (P-1591), Aug. 12, 1993 (JP-A 05 089646, dated Apr. 9, 1993).

*Primary Examiner*—Nabil Hindi
*Attorney, Agent, or Firm*—Sughrue, Mion, Zinn, Macpeak & Seas

[57] ABSTRACT

A reproducing system has a pickup for reading data on an optical disc, a memory, a memory controller for storing data read out by the pickup in the memory, and a reproducing device for reproducing data stored in the memory. High speed scanning is instructed. In response to the instruction, the memory controller operates to reproduce data already stored in the memory at skipped positions.

5 Claims, 8 Drawing Sheets

PRIOR ART

PRIOR ART

REPRODUCING SYSTEM FOR AN OPTICAL RECORDING MEDIUM HAVING IMPROVED RESPONSE TO A HIGH SPEED SCANNING INSTRUCTION

This is a Continuation of Application Ser. No. 08/342,014 filed Nov. 16, 1994 now abandoned.

BACKGROUND OF THE INVENTION

The present invention relates to a system for reproducing a magneto-optical recordable disc such as Minidisc of SONY, and more particularly to a scanning system.

Today, the Minidisc (MD), which is capable of random access, as well as the CD, has become popular. One type of the MD is only for reproduction and is manufactured in the same manner as the CD. Another type of MD is a recordable MD made of magneto-optical disc, capable of over-writing by a magneto-optical modulation recording method. Namely, in order to write data on the disc, a laser beam is radiated from under the disc to elevate the temperature thereof, and a magnetic field is applied from above to reverse the magnetic field of the recording surface. Hence the recordable MD cartridge has a shutter having an access window on either side thereof.

The main feature of the MD is its full function of random accessibility. For example, when polycarbonate is injection molded to form a substrate of the MD, a pregroove is also formed along the entire track of the disc so that a track-following servo system and spindle servo system are utilized at recording and at reproduction.

Addresses are recorded along the entire track of the MD so that a stable and quick random access is possible even in the case of unrecorded disc. Hence, editing of the disc is much simplified.

Figure 8:
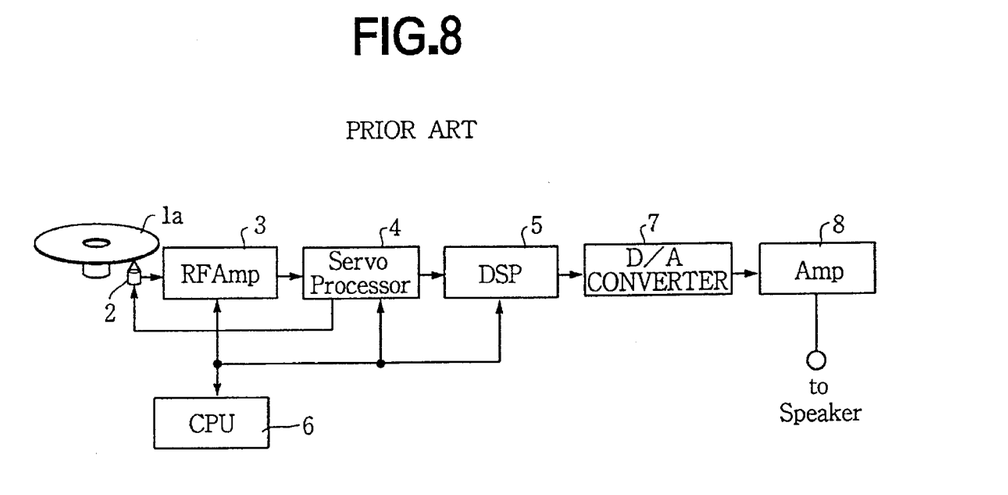
FIG. 8 is a block diagram of a conventional CD player.

Referring to FIG. 8, a disc player for reproducing a CD 1a has a pickup 2 for reading out data recorded thereon. The read out data are amplified by an R/F amplifier 3 and fed to a digital signal processor 5 through a servo processor 4. The data are further fed to a D/A converter 7 so as to be converted into an analog signal. The analog signal is amplified by an amplifier 8 and outputted through a loudspeaker. The R/F amplifier 5, servo processor 4, and digital signal processor 5 are controlled by a CPU 6.

Figure 9:
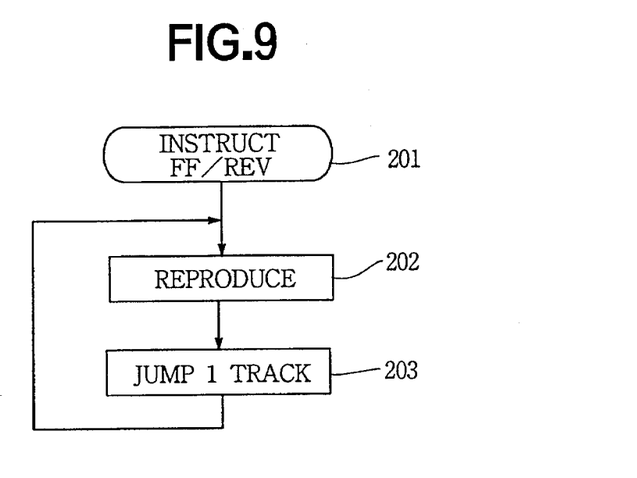
FIG. 9 is a flowchart describing a scanning operation of the CD player of FIG. 8.
Figure 10:
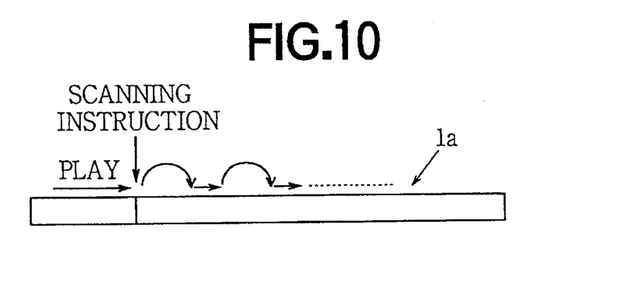
FIG. 10 is an illustration of a CD for explaining the operation of FIG. 9.

In such a player, a scanning for quickly reproducing the recorded data is performed by depressing a fast forward button or a reverse button while playing a CD. Namely, as shown in FIG. 9, when the scanning is instructed while playing at a step 201, the player reproduces the data for a very short time such as several tens of milliseconds at a step 202. At a step 203, the pickup 2 of the player jumps to the adjacent track, and then again reproduces the data for several tens of milliseconds. The steps 202 and 203 are repeated so that the data are intermittently reproduced as shown in FIG. 10.

Figure 11:
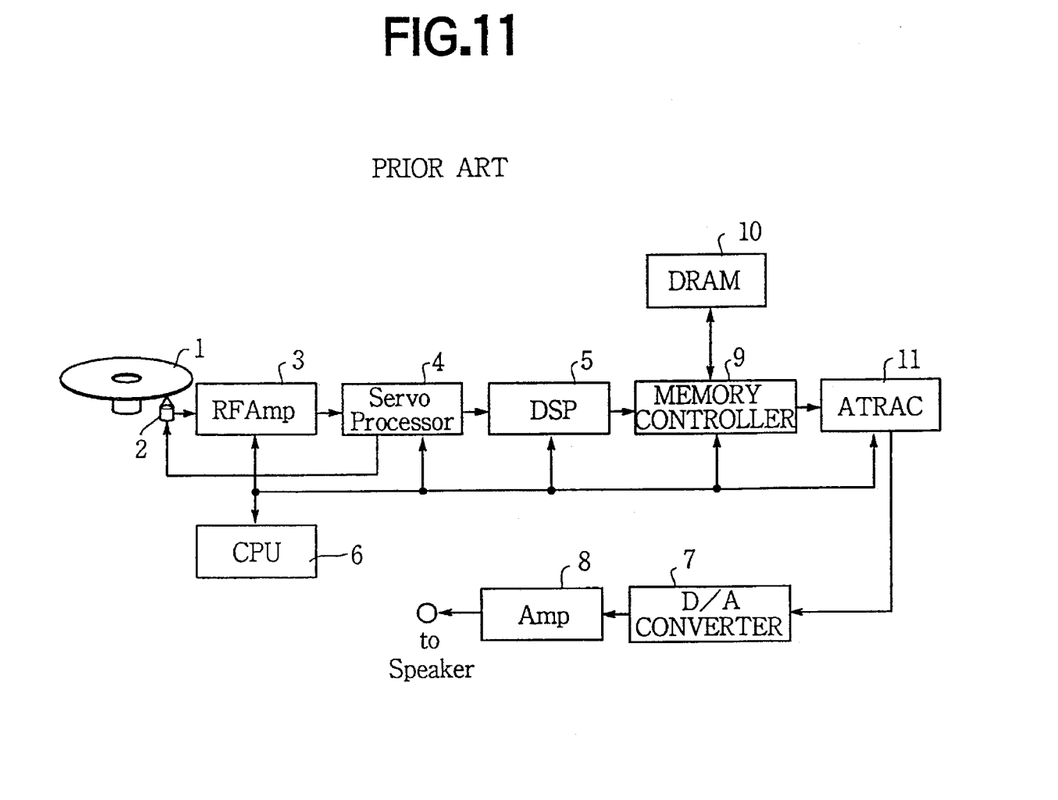
FIG. 11 is a block diagram of conventional MD player.

Referring to FIG. 11, a conventional player for an MD 1 has a memory controller 9, a dynamic random access memory (DRAM) 10, and an adaptive transform acoustic coding (ATRAC) 11 in addition to the CD player circuitry shown in FIG. 8. That is, the reproduced data processed at the digital signal processor 5 is written in the DRAM 10 by the memory controller 9. Audio data recorded on the MD 1 is not always regularly arranged. The data of the disc are read out in accordance with the logical arrangement information and written in the DRAM 10. The stored data are read out by the memory controller 9 and fed to the ATRAC 11 to be decoded. The decoded data are thereafter converted into an analog signal by the D/A converter 7 and fed to a loudspeaker through the amplifier 8.

The use of the DRAM is advantageous in preventing skipping of sounds which occur when the pickup 2 jumps by a shock. More particularly, the pickup reads digital data recorded on the MD 1 at the speed of 1.4 Mbit/sec and the read-out data are written in the DRAM. On the other hand, the ATRAC 11 decodes the data at the speed of 0.3 Mbit/sec so that the analog signal is produced at the D/A converter 7 and reproduced without interruption if the jump occurs. Supposing that the capacity of the DRAM 10 is one Mbit, while the MD is played, the DRAM becomes full in 0.9 second. When a jump of the pickup occurs, it becomes impossible for the pickup to read the data. However, since the data stored in the DRAM 10 is fed to the ATRAC 11 for another three seconds, if the pickup quickly returns to the position where the data are not read in three seconds and resumes the reading, there is no interruption in the audio signal fed to the loudspeaker. Hence the DRAM is sometimes called a shock proof memory or a data buffer. The position where the data are not read can be easily determined by checking the addresses which are recorded along the entire track of the MD.

Figure 12:
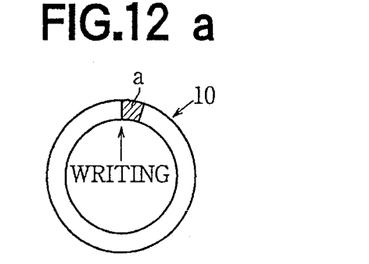
FIG. 12a to 12d are illustrations showing the DRAM for explaining the operation of the MD player of FIG. 11.
Figure 14:
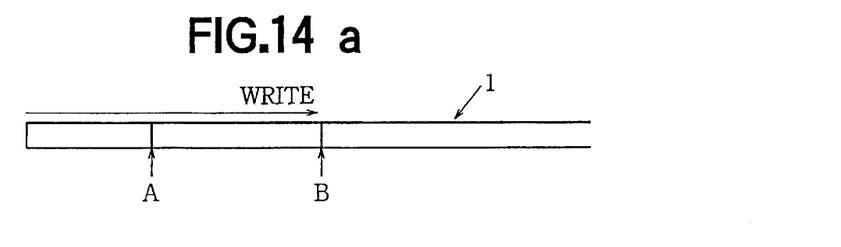
FIGS. 14a and 14b are illustrations showing the MD in the operation of FIG. 13.

As shown in FIGS. 12a to 12d, the DRAM 10 is a ring buffer. Referring to FIG. 12a, when the MD 1 is played, the data is read and written in the DRAM 10 starting from an area a, that is the hatched portion in the figure, and further the writing continues in a clockwise direction. After a predetermined time, the data are read out from the area a and fed to the loudspeaker to generate sound while data are written at an area b of the DRAM. Namely, as shown in FIG. 14a, the data in the DRAM are read out at a point A of the MD 1 to emit a sound, although the pickup 2 has already proceeded to a point B, reading and writing the data thereat.

Figure 13:
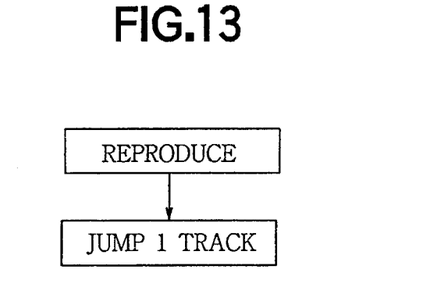
FIG. 13 is a flowchart describing the scanning operation of the MD player of FIG. 11.

When the entire recording area of the ring is written as shown in FIG. 12c, the data are written again in the area a whereas the data are read from an area c for generating sound. When the fast forward button is depressed for fast forward scanning after the DRAM 10 becomes full, all of the stored data which should be reproduced in a normal reproduction are erased (see FIG. 12d). Hence, no further data are read out from the DRAM 10. The pickup 2 at the point B of the MD 1 in FIG. 14a then jumps back to the point A where the data are being read out and reproduced at the request of the fast scanning. Thereafter, a program shown in FIG. 13 is started. More particularly, at the point A of FIG. 14b, data on the disc are read out for several tens of milliseconds and written in the DRAM, and reproduced. The pickup 2 then jumps to the adjacent track and the data on the disc are read and written and the data stored in the DRAM 10 are read for generating sound. The skip writing and reproducing are repeated so that the scanning is performed.

In such a conventional player, the pickup must return to the position where the data are actually being output as sound, and the data must be written before the sound is emitted. Thus the operational response of the player is poor.

SUMMARY OF THE INVENTION

An object of the present invention is to provide an optical disc player where scanning can be quickly performed.

According to the present invention, there is provided a reproducing system for an optical disc having data recorded thereon, the system having a pickup for reading the data on the disc, a memory, a memory controller for storing data read out by pickup in the memory, and a reproducing device for reproducing data stored in the memory.

The system comprises means for instructing high speed scanning, the memory controller being arranged to respond to an instruction for high speed scanning to reproduce data stored in the memory at skipped positions.

The system further comprises writing means responsive to an instruction for writing data read out by the pickup in a skipping manner in the memory.

The other objects and features of this invention will become understood from the following description with reference to the accompanying drawings.

DETAILED DESCRIPTION OF THE PREFERRED EMBODIMENT

Figure 1:
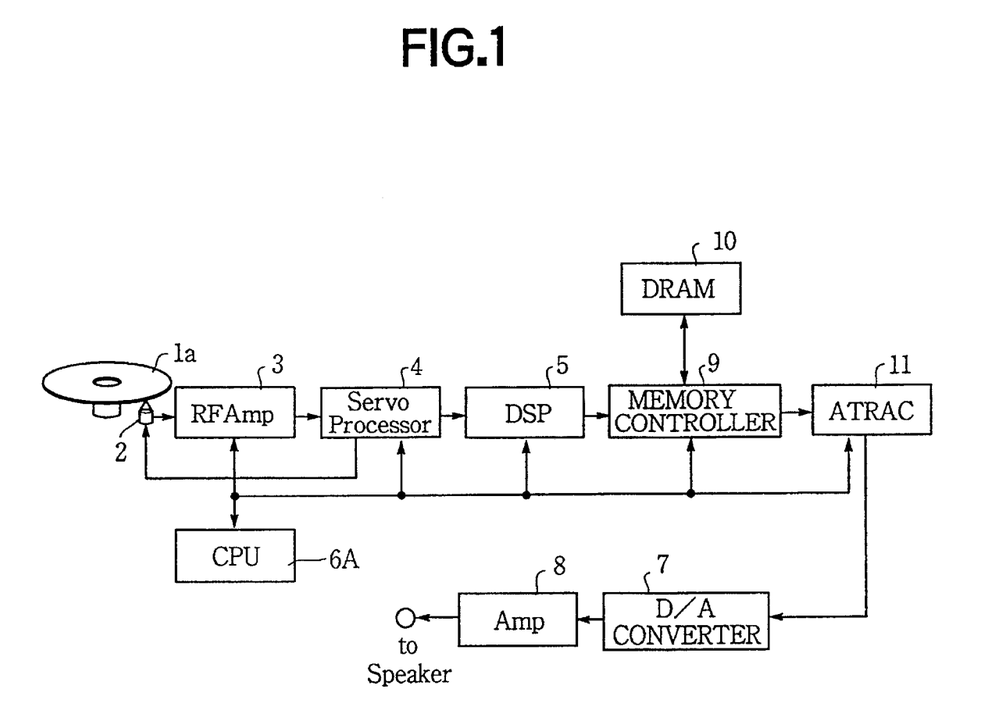
FIG. 1 is a block diagram showing an optical disc player according to the present invention.

Referring to FIG. 1, the present invention is applied to an optical disc player having the same construction as that shown in FIG. 11. A CPU 6A of the present invention is provided with a data reproduction controller which enables an intermittent reading of data from the DRAM, the operation of which will be later described in detail.

The data on the MD 1 are read out by the pickup 2 and consecutively written in the DRAM 10, and read out therefrom after a delay, as in the conventional player. Namely, as shown in FIG. 4a, the pickup 2 is positioned at the point B ahead of the point A where the currently audible data is found. When the DRAM 10 is full as shown in FIG. 3a, the data are written in an area d while data in an area e are read out.

Figure 2:
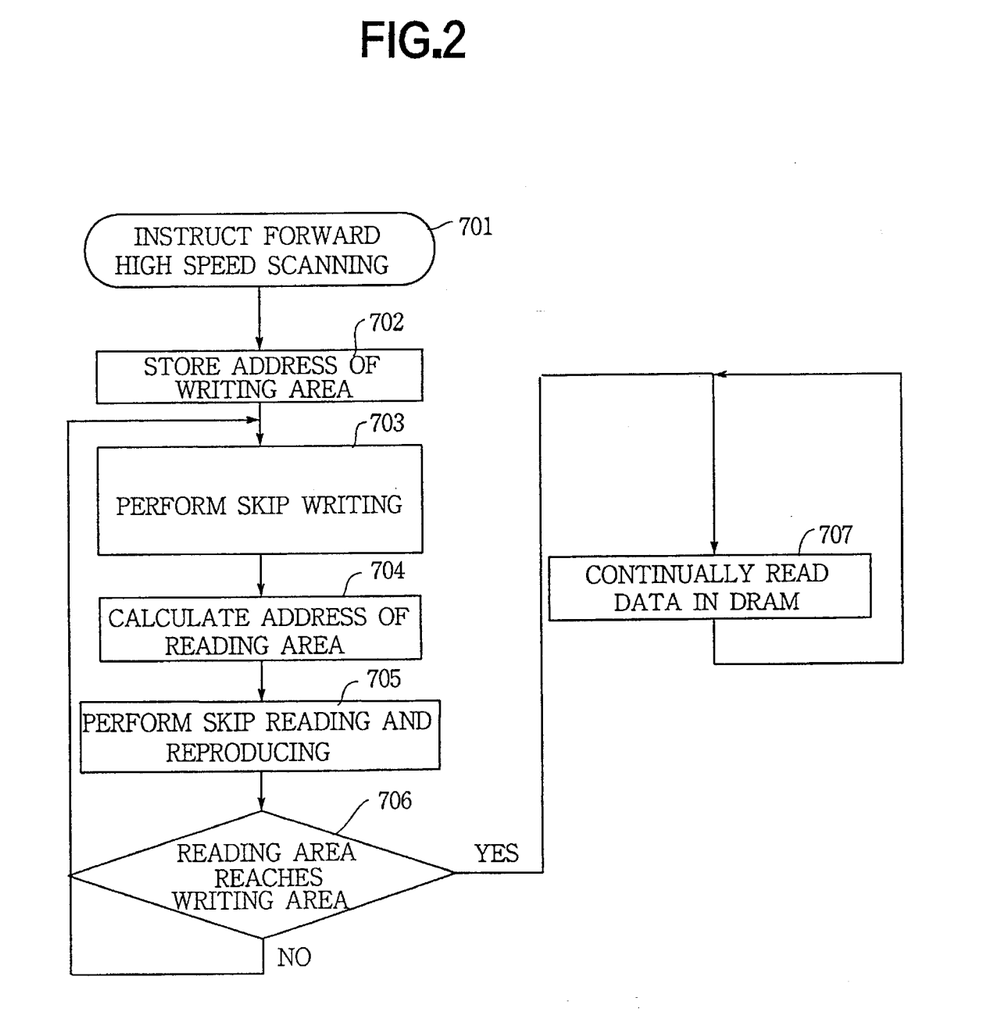
FIG. 2 is a flowchart describing a forward scanning operation of the disc player of the present invention.
Figure 3:
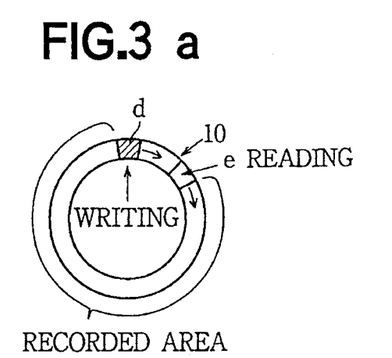
FIGS. 3a to 3c are illustrations showing a DRAM provided in the player for explaining the operation of FIG. 2.
Figure 4:
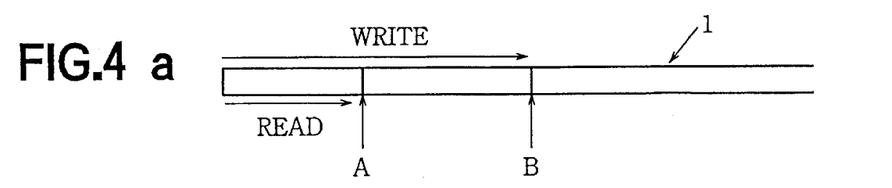
FIGS. 4a to 4c are illustration of an MD for explaining the operation of FIG. 2.
Figure 5:
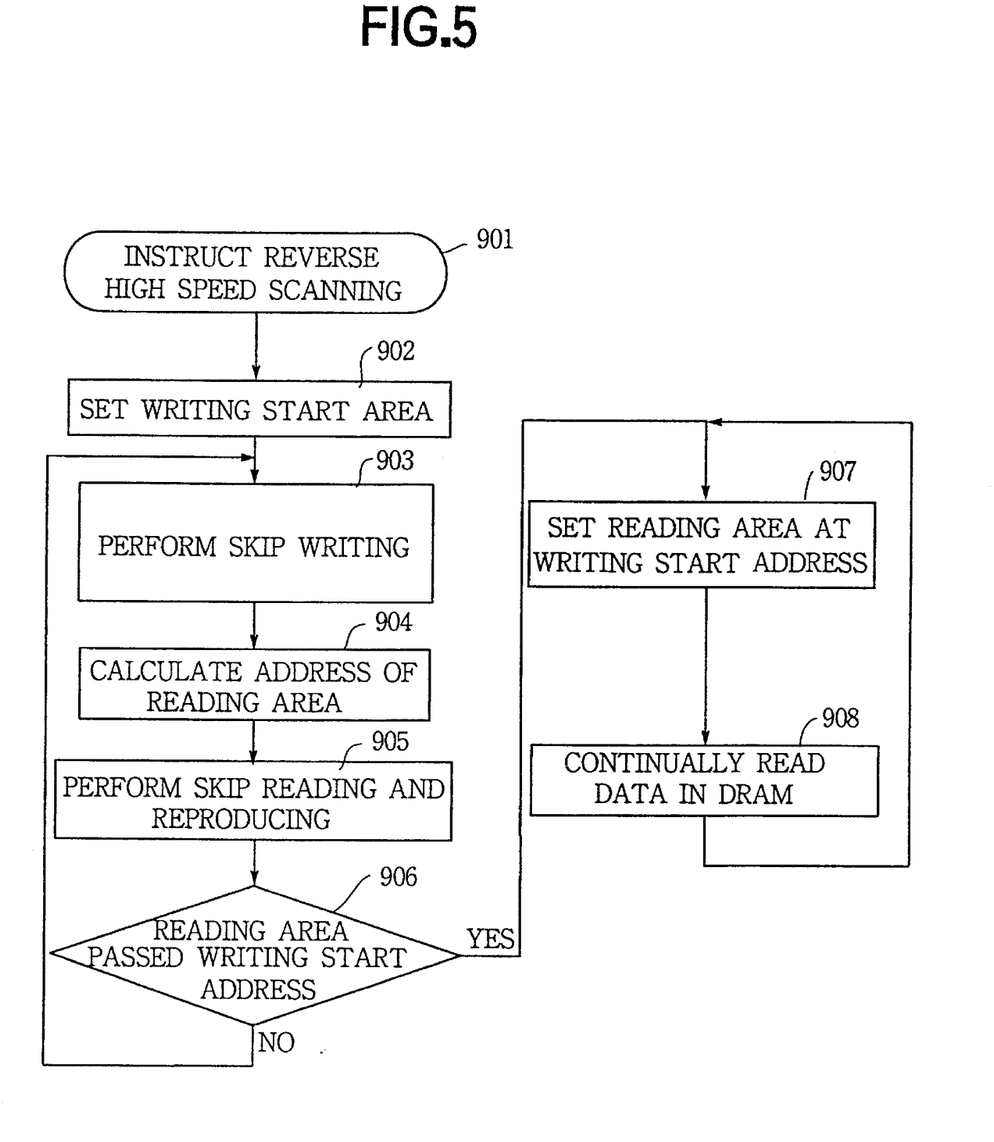
FIG. 5 is a flowchart describing the reverse scanning operation of the disc player.

Referring to FIG. 2, when a fast forward scanning button is depressed at a step 701 in the state of FIG. 3a, the forward high speed scanning is instructed. The address of the area d where the data are being written is stored at a step 702. At a step 703, the pickup 2 jumps from the point B as shown in FIG. 4b and reads out the data recorded on the MD 1 for a predetermined time. The intermittently read out data are continuously written in the DRAM 10. The jumping and reading and continuous writing operation is repeatedly continued (step 703).

At the same time, memory controller 9 calculates the address of the area in the DRAM from which data is to be read out, and data at the calculated address are read out and reproduced. Namely, in the forward scanning, data already stored in the DRAM 10 are skipped and reproduced, as shown in FIG. 3b. (steps 704, 705). When the calculated address of the reading area is behind the stored address of the writing area d at a step 706, the program returns back to the step 703, thereby continuing the same operation.

When it is determined that the calculated address reaches the stored address of the area d, the program proceeds to a step 707 where reading the intermittent data written in the DRAM is started from the area d. Thus, from the point B, the data are continuously read out as shown in FIG. 4c. The operation is continued until the scanning instruction is revoked.

Figure 6:
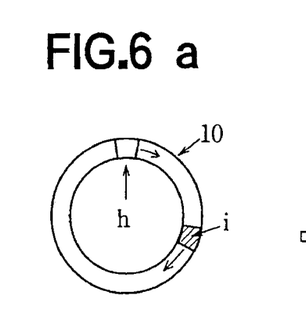
FIGS. 6a to 6d are illustrations showing the DRAM for explaining the operation of FIG. 5.
Figure 7:
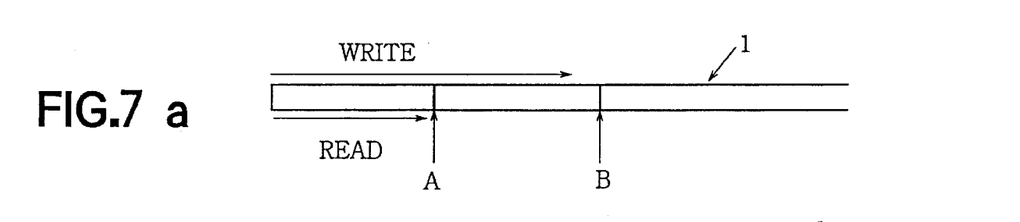
FIGS. 7a to 7c are illustrations of the MD for explaining the operation of FIG. 5.

Referring to FIGS. 5 to 7c, when the MD 1 is normally played, the data at the point A shown in FIG. 7a which are stored in an area h of the DRAM 10 in FIG. 6a is read out. On the other hand, the pickup 2 reads data written at the point B, the data of which is written in an area i. As the data are written in the clockwise direction, they are read out after a delay. When the DRAM 10 is full so that the data is again written in the area h, the data are read out from an area j as shown in FIG. 6b.

When a reverse scanning button is depressed, the reverse scanning is instructed at a step 901. The data stored in the DRAM and not yet read out are erased so that a writing area is provided. At step 902, the address of the area h is stored, and an address of a writing start point is determined and stored. For example, the address of an area k in FIG. 6c (point C of MD of FIG. 7b) is set as a writing start point. The pickup 2 searches the position C on the MD 1 which corresponds to the address of the area k. That is, the pickup 2 jumps back from the point B to the point C as shown in FIG. 7b.

At a step 903, the pickup 2 jumps rearward a predetermined number of tracks and reads out the data starting at that position for a predetermined time, the read out data are written in the DRAM. Thereafter, the jumping backward and writing are repeated as shown in FIG. 7b.

At the same time, the addresses of reading areas such as areas l and m in FIG. 6c which are to be intermittently read out in the counterclockwise direction are calculated at a step 904. The data in the areas l and m are already read out in the normal playing operation. Thereafter, at a step 905, the data in the areas l and m behind the area j are read out in the counterclockwise direction while skipping the areas therebetween, and the read out data are reproduced.

At a step 906, the address of the current reading area is compared with the address of the area h set at the step 902, when the reading area is still in advance of the address, the program goes back to the step 903, thereby continuing the writing operation of the data before the point C and the reading operation of the already recorded data. When the address of the reading area coincides with the address of area h, the program goes to a step 907 where the next reading area is set at the area k where the writing is started. Thereafter, at a step 908, the data are read out in the clockwise direction.

Thus, in accordance with the present invention, the scanning data can be immediately used for generating sound by reading the data already stored without waiting for the pickup to move to a desired position and read the data recorded thereat. Hence the response is improved.

The present invention may be applied to a CD player provided with a memory in which data to be reproduced are stored.

The memory provided in the present invention need not be confined to a ring buffer memory as long as the audio data can be consecutively accessed. For example, a large memory capable of storing data of the whole MD can be used. Moreover, the data need not be consecutively stored in the memory. Namely, the addresses may be arranged either continually or irregularly, in order or in reverse.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A system for reproducing data recorded on an optical disk, said system comprising:

a pickup for reading data on the disk;

a memory for receiving and storing the data read by said pickup;

an output for reading the stored data;

a memory controller governing a writing rate at which the data read from the disk is received by said memory and a reading rate at which the stored data is read by said output, wherein the writing rate can exceed the reading rate; and a means for responding to a high speed scanning instruction, said means (i) determining a start address of said memory corresponding to a portion of the stored data stored prior to the scanning instruction but not yet read by said output, and (ii) controlling said output to perform alternating jump and read operations, thereby outputting intermittent portions of the stored data beginning at the determined start address, and simultaneously controlling said pickup to alternately jump and read portions of the disk in a predetermined direction.

2. In a system for reproducing data recorded on an optical disk, said system comprising a pickup for inputting the recorded data, a memory for receiving and storing the inputted data, an output for reading the stored data, and a memory controller governing a writing rate at which the inputted data is received by the memory and a reading rate at which the stored data is read by the output, wherein the writing rate can exceed the reading rate; a method for responding to a high speed scanning instruction comprising:

determining a start address of the memory corresponding to a portion of the stored data stored prior to the scanning instruction but not yet read by the output; and controlling the output to perform alternating jump and read operations and thereby output intermittent portions of the stored data beginning at the determined start address and simultaneously controlling the pickup to alternately jump and read portions of the disk in a predetermined direction.

3. The method according to claim 2, further comprising:

controlling the pickup to perform alternating jump and read operations and thereby output intermittent portions of the recorded data, and simultaneously controlling the memory output to perform alternating jump and read operations and thereby output intermittent portions of the stored data;

in the memory, receiving and storing the intermittent portions of the recorded data at the writing rate; and controlling the output to output the intermittent portions of the recorded data.

4. A reproducing system for an optical disc having data recorded thereon, the system having a pickup for reading the data on the disc, a memory, a memory controller for writing data read out by the pickup into the memory and for reading data stored in the memory, after the writing of the data by the pickup, with a delay from the memory, and reproducing means for reproducing the data read out from the memory, comprising:

means for instructing high speed scanning with a high speed scanning instruction; and the memory controller being arranged to respond to the high speed scanning instruction to begin to write data which are intermittently read out from the optical disc and to simultaneously begin skip reading out the data previously stored in the memory from a data portion being reproduced at the time of the instruction, and to begin to reproduce the skip read out data from the memory.

5. The system according to claim 4 further comprising means for storing an address where the intermittent reading of data from the disc and writing into memory of the data from the disc begins, and the memory controller is configured to begin continuous reading of data when an address of the data being skip read reaches the stored address.

* * * * *